(12) United States Patent
Kasai (10) Patent No.: US 6,774,309 B2
(45) Date of Patent: Aug. 10, 2004

(54) DRAINAGE CONSTRUCTION OF A WATERPROOF COVER OF AN ELECTRICAL CONNECTION BOX

(75) Inventor: Koji Kasai, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 10/459,302

(22) Filed: Jun. 11, 2003

(65) Prior Publication Data

US 2003/0230425 A1 Dec. 18, 2003

Related U.S. Application Data

(63) Continuation-in-part of application No. 10/205,149, filed on Jul. 24, 2002, now Pat. No. 6,635,823.

(30) Foreign Application Priority Data

Jun. 14, 2002 (JP) ........................................ 2002-174235

(51) Int. Cl.[7] ................................................. H02G 3/14
(52) U.S. Cl. .......................... 174/66; 174/50; 174/17 R; 220/4.02; 439/76.2
(58) Field of Search ............................. 174/66, 67, 50, 174/52.1, 59, 65 R, 17 R, 100; 220/3.2, 3.4, 3.8, 4.02, 4.01, 241, 242; 439/76.2, 949, 76.1, 139, 165

(56) References Cited

U.S. PATENT DOCUMENTS

| | | | |
|---|---|---|---|
| 5,557,067 A | * | 9/1996 | Messelhi .................... 174/59 |
| 5,574,254 A | | 11/1996 | Mori et al. |
| 5,674,090 A | | 10/1997 | Sumida et al. |
| 5,755,579 A | | 5/1998 | Yanase et al. |
| 5,864,091 A | * | 1/1999 | Sumida ........................ 174/50 |
| 5,995,380 A | | 11/1999 | Maue et al. |
| 6,008,454 A | * | 12/1999 | Kawakita ................... 174/52.1 |
| 6,045,412 A | | 4/2000 | Guanco et al. |
| 6,077,102 A | | 6/2000 | Borzi et al. |
| 6,108,202 A | | 8/2000 | Sumida |
| 6,121,548 A | | 9/2000 | Matsuoka |
| 6,462,270 B1 | | 10/2002 | Depp et al. |
| 6,545,217 B2 | | 4/2003 | Sato |
| 6,635,823 B2 | * | 10/2003 | Kasai et al. .................. 174/66 |

* cited by examiner

Primary Examiner—Dean A. Reichard
Assistant Examiner—Angel R. Estrada
(74) Attorney, Agent, or Firm—Gerald E. Hespos; Anthony J. Casella (57) ABSTRACT

A waterproof cover (13) is provided on an upper surface (11b) of a casing (11) of an electrical connection box (10). The waterproof cover (13) is formed with a recess (13b) for collecting water fallen down on the outer surface of the waterproof cover (13). One end of the recess (13b) with respect to a longitudinal direction is raised to form a water-diverting portion (13d), a rib (13c) projects up at the other end of the recess (13b), and a dropping portion (13e) is provided below the rib (13c). Waterdrops M that fall down on the outer surface of the waterproof cover (13) stay temporally in the recess (13b) and drain along the dropping portion (13e) when the water level thereof exceeds the rib (13c). Further, a slanted guide (12c) projects from a bracket (12) below the dropping portion (13e).

10 Claims, 8 Drawing Sheets

DRAINAGE CONSTRUCTION OF A WATERPROOF COVER OF AN ELECTRICAL CONNECTION BOX

This application is a continuation-in-part of U.S. patent application Ser. No. 10/205,149 filed on Jul. 24, 2002 now U.S. Pat. No. 6,635,823.

BACKGROUND OF THE INVENTION

1. Field of the Invention

The invention relates to a drainage construction of a waterproof cover of an electrical connection box and is particularly designed to prevent water from entering a junction box for an automobile vehicle.

2. Description of the Related Art

Some junction boxes for automotive vehicles often are mounted below ducts of air conditioners in the vehicle. Waterdrops are likely to accumulate on the ducts and could drop down from the ducts and onto the junction boxes or wires that communicate with the junction boxes. These waterdrops could enter water-free areas of the junction boxes, such as the connector accommodating portions. Accordingly, junction boxes and related parts should be designed to prevent the entry of water.

Figure 9:
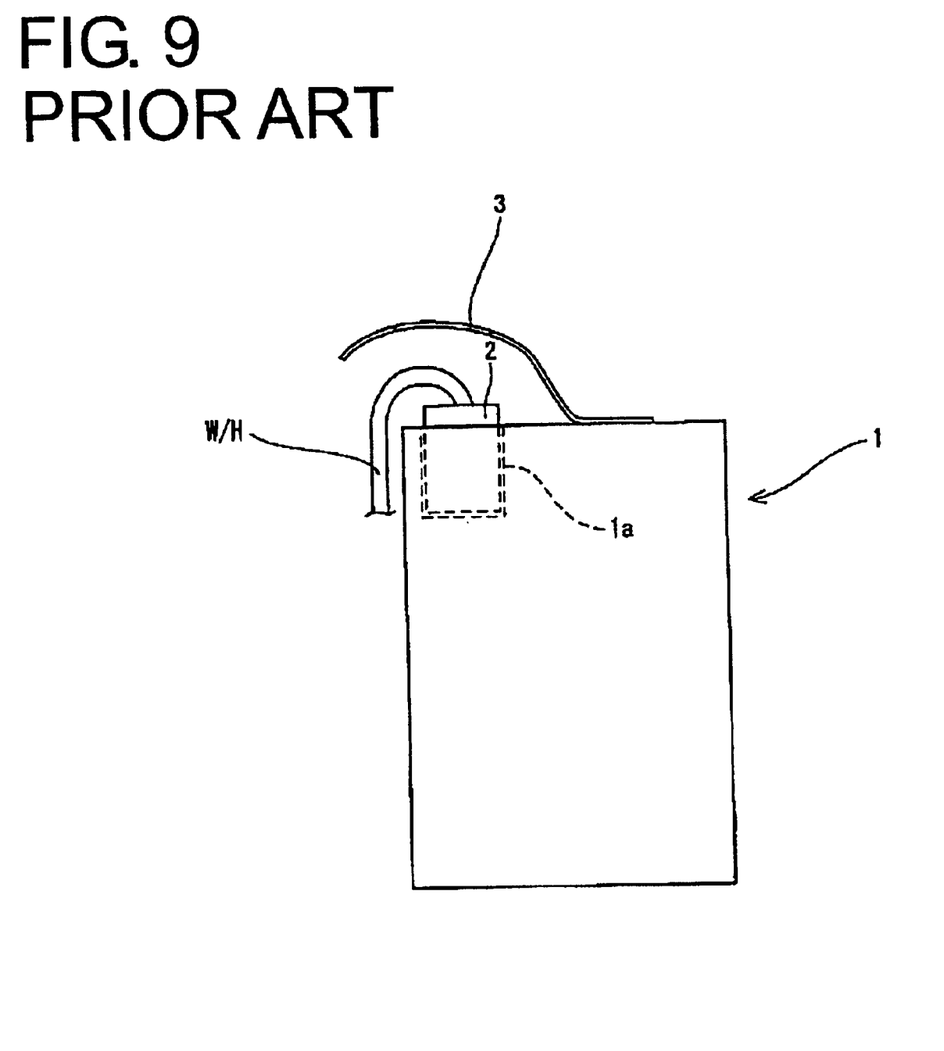
FIG. 9 is a view of a prior art junction box.

FIG. 9 shows a junction box 1 with a casing and a connector accommodating portion 1a in an upper surface of the casing. A connector 2 is provided at an end of a wiring harness W/H and is fit into the connector accommodating portion 1a. A waterproof sheet 3 is adhered in a position to prevent waterdrops from entering the connector accommodating portion 1a.

The above-described waterproof sheet 3 may deform during use into a shape that causes the waterdrops to flow in unexpected directions. Thus, waterdrops that fall from the duct and onto the waterproof sheet 3 may run along the rear surface of the waterproof sheet 3 or otherwise flow from the sheet 3 into the water-free areas. Further, water that falls on the waterproof sheet 3 may stay on the sheet 3 without immediately running off the sheet 3. In such a case, the accumulated water may run down at once due to an unexpected deformation of the waterproof sheet 3 and may be scattered in the water-free areas.

An operator may forget to adhere the waterproof sheet 3 after the connector 2 is fit into the connector accommodating portion 1a of the junction box 1. Thus, water may enter the connector accommodating portion 1a or other water-free areas of the junction box 1.

The present invention was developed in view of the above problems and an object thereof is to drain water reliably for preventing water from entering water-free areas of an electrical connection box, and to ensure that forgetfulness of an operator cannot lead to intrusion of water.

SUMMARY OF THE INVENTION

The invention is directed to a drainage construction of a waterproof or waterdeflecting cover of an electrical connection box. The construction comprises a waterproof or water-deflecting cover to be provided on an upper surface of a casing of an electrical connection box. The waterproof cover comprises at least one recess for at least temporarily collecting or deviating water that falls down on the outer surface of the waterproof cover. At least one water-diverting portion is formed by raising a portion of the recess, and by providing a dropping portion. Waterdrops that fall down on the outer surface of the waterproof cover stay at least temporarily in the recess and then drain along the dropping portion. Accordingly, a drainage path is set intentionally for the waterdrops. Therefore, waterdrops that fall down from the outer surface of the waterproof cover are prevented from dropping down onto the water-free areas of the electrical connection box.

At least one water collection causing portion may project up at another location. The water collection causing portion may comprise at least one rib that projects up the other end of the recess.

The dropping portion preferably is below the water collection causing portion.

Waterdrops that fall down on the outer surface of the waterproof cover preferably are caused to stay at least temporarily in the recess and are caused to be drained along the dropping portion when the water level exceeds the height of the rib or other water collection causing portion.

More specifically, waterdrops are collected first in the recess on the outer surface of the waterproof cover. The water-diverting portion preferably is raised at one side of the recess with respect to the longitudinal direction. Thus, water in the recess is introduced to the side that has the dropping portion.

The rib or other water collection causing portion projects up at the other side to dam the water in the recess and to cause the water to stay at least temporarily in the recess. Thus, the water can be caused to vaporize preferably without being drained out of the cover in the case of a small quantity of waterdrops.

Water in the recess may reach a level that exceeds the height of the rib or other water collection causing portion. However, such water can be drained reliably to a place other than the water-free areas of the electrical connection box by running down on the dropping portion that projects below the rib or other water collection causing portion.

A groove preferably is formed vertically in the dropping portion of the waterproof cover for guiding the water. Thus, water that drops down along the dropping portion can be guided reliably to an intended place along the groove.

The waterproof cover preferably is mounted rotatably or pivotably on a bracket for fixing the electrical connection box to a vehicle body to cover the upper surface of the casing. A first connector preferably is fit into a connector accommodating portion in the upper surface of the casing with the waterproof cover rotated to a standby position that preferably is toward a side surface of the casing. Thus, the cover substantially blocks entry of a connector into a connector accommodating portion in the side surface of the casing. A second connector may be fit into the connector accommodating portion in the side surface of the casing when the waterproof cover is rotated to a proper position that preferably is toward the upper surface of the casing. With this construction, the connector accommodating portion in the side surface of the casing is covered at least partly by the waterproof cover when the first connector is fit into the connector accommodating portion in the upper surface of the casing. Thus, the second connector cannot be fit into the connector accommodating portion unless and until the waterproof cover is rotated to the proper position.

A slanted guide portion preferably projects below the dropping portion, and a bottom end of the slanted guide portion is more outward than water-free areas of the electrical connection box.

Design factors may prevent the dropping portion of the waterproof cover from being more outward than the water-free areas of the electrical connection box. However, the slanted guide portion in the standby state is below the dropping portion and drains water that drops down from the dropping portion outside the water-free areas of the electrical connection box.

The slanted guide portion may be formed integrally at the waterproof cover if permitted by design parameters.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

A junction box according to the invention is identified by the numeral 10 in FIGS. 1 to 4, on or to which a waterproof cover 13 is mounted is illustrated in FIGS. 1 to 4.

Figure 1:
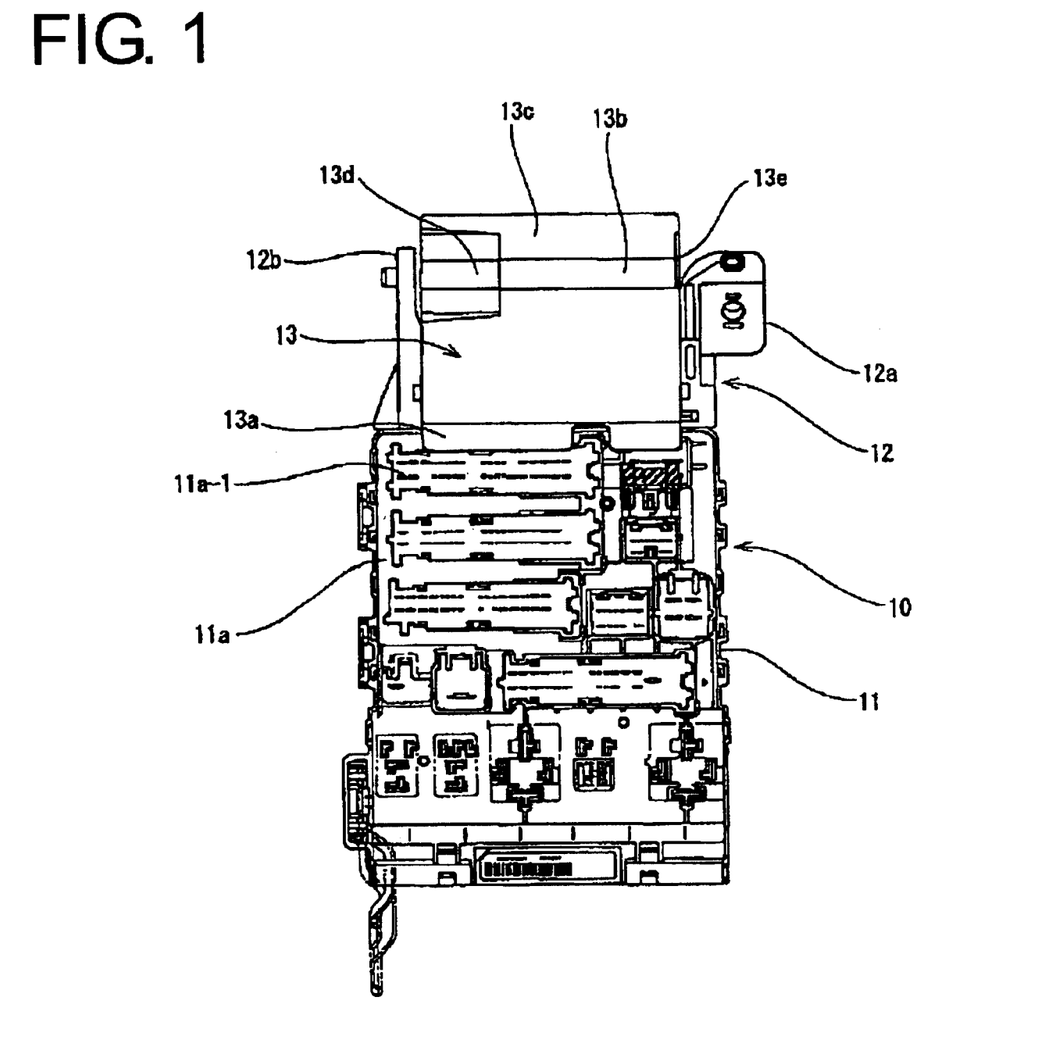
FIG. 1 is a front view of a junction box according to one embodiment of the invention with a bracket and a waterproof cover mounted thereon.
Figure 2:
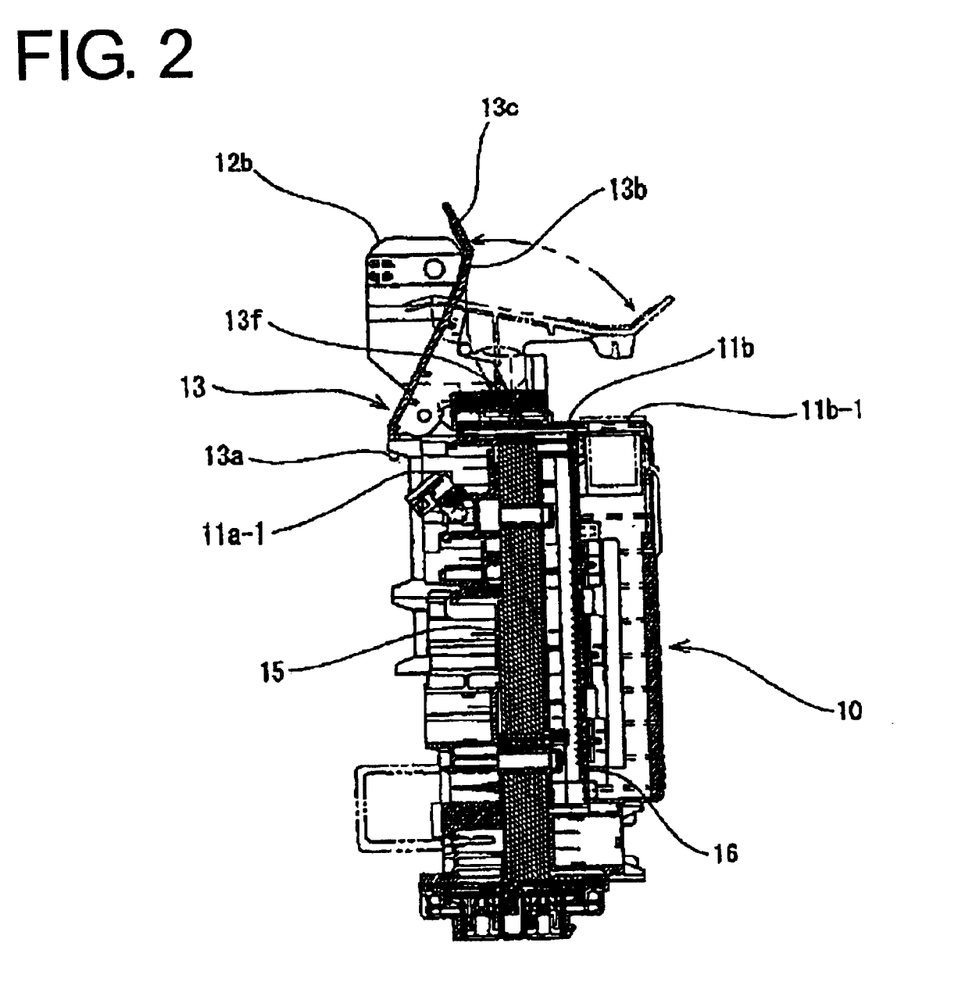
FIG. 2 is a right side view in section of the junction box of FIG. 1.
Figure 3:
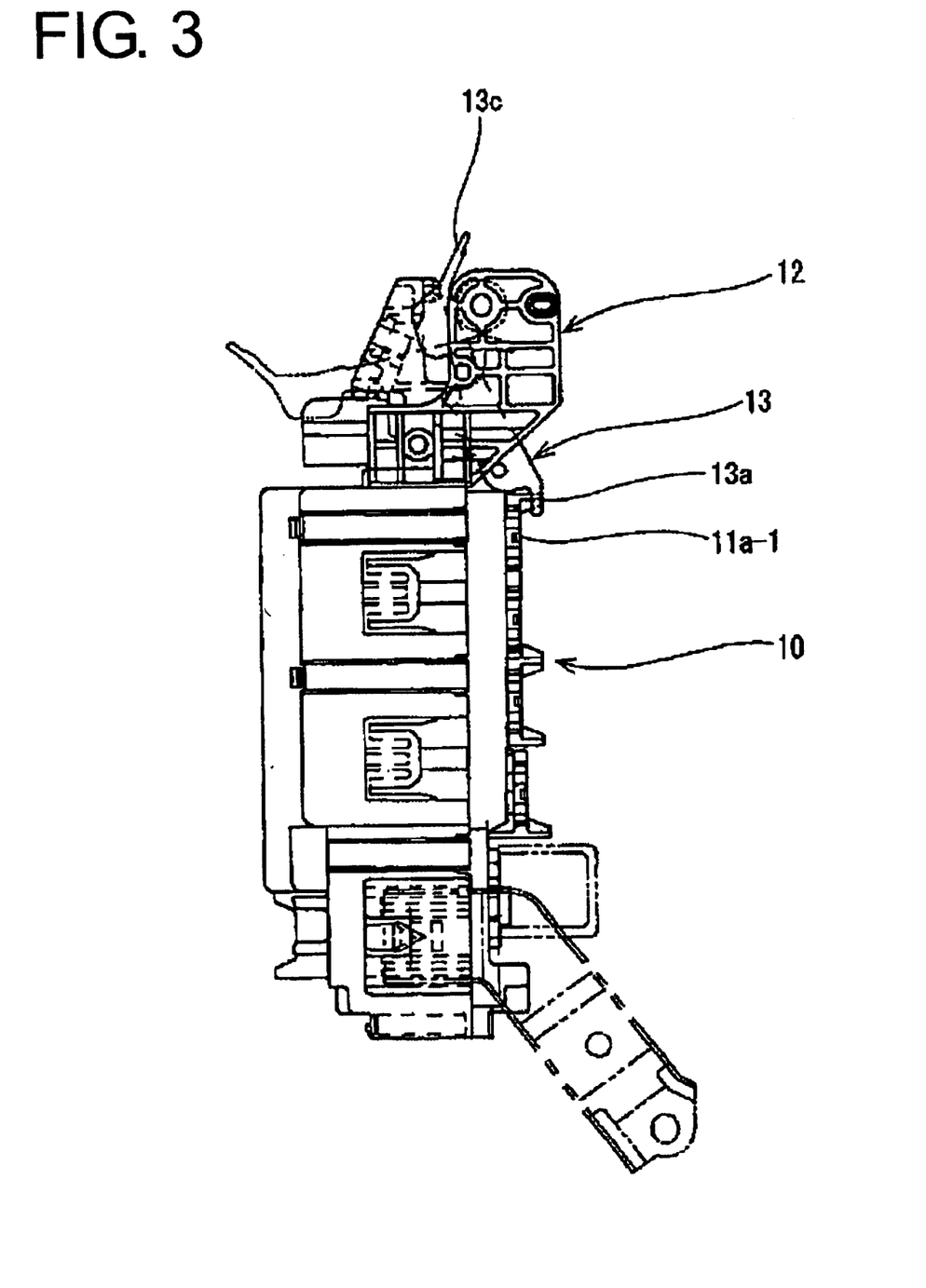
FIG. 3 is a left side view of the junction box of FIG. 1.
Figure 4:
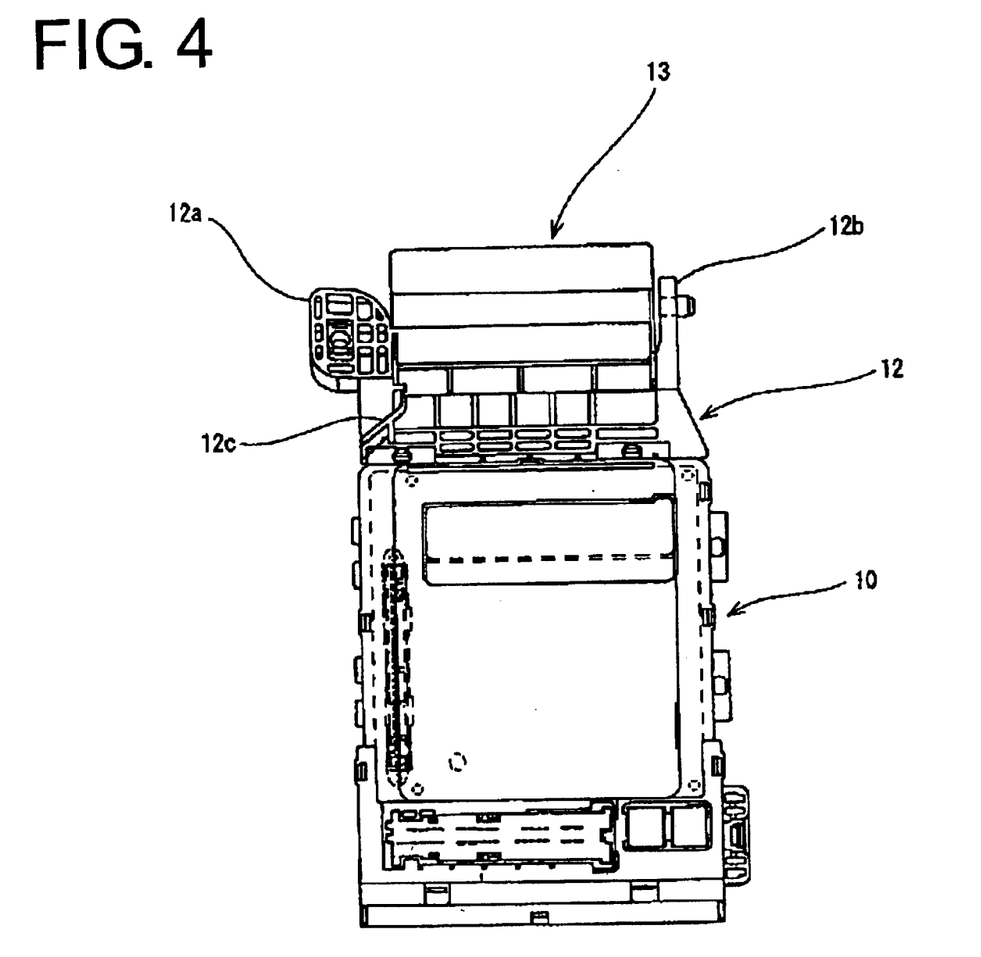
FIG. 4 is a rear view of the junction box of FIG. 1.

As shown in FIG. 2, the junction box 10 has a casing 11 with a side surface 11a and an upper surface 11b. Connector accommodating portions 11a-1 and 11b-1 are provided respectively in the side and top surfaces 11a and 11b. Busbars 15 and an EUC circuit board 16 are accommodated in the casing 11 to form a circuitry or a part of a circuitry.

Figure 6:
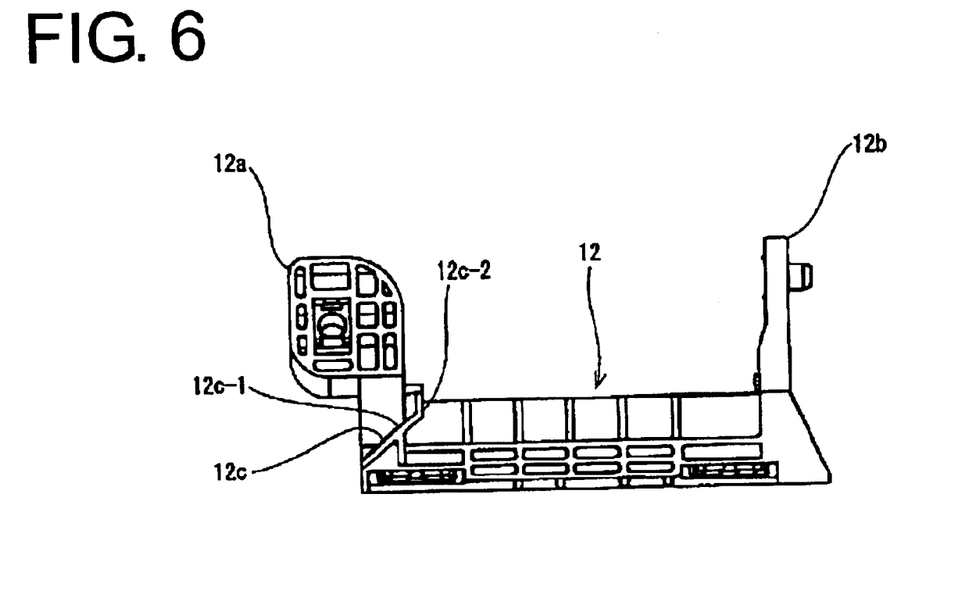
FIG. 6 is a rear view of the bracket.

A bracket 12 is mounted on the side surface 11b of the casing 11, as shown in FIG. 6. Mount portions 12a, 12b project up from substantially opposite sides of the bracket 12 for mounting the junction box 10 on a body of an automotive vehicle. A slanted guide portion 12c projects at the rear side of one mount portion 12a and has a slanted portion 12c-1 and a substantially vertical portion 12c-2.

Figure 5A:
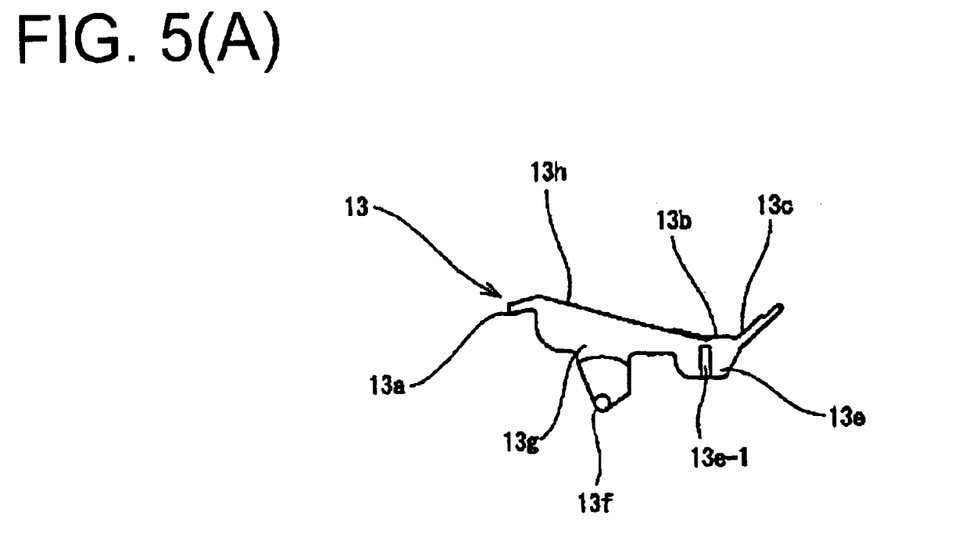
FIG. 5(A) is a side view of the waterproof cover.
Figure 5B:
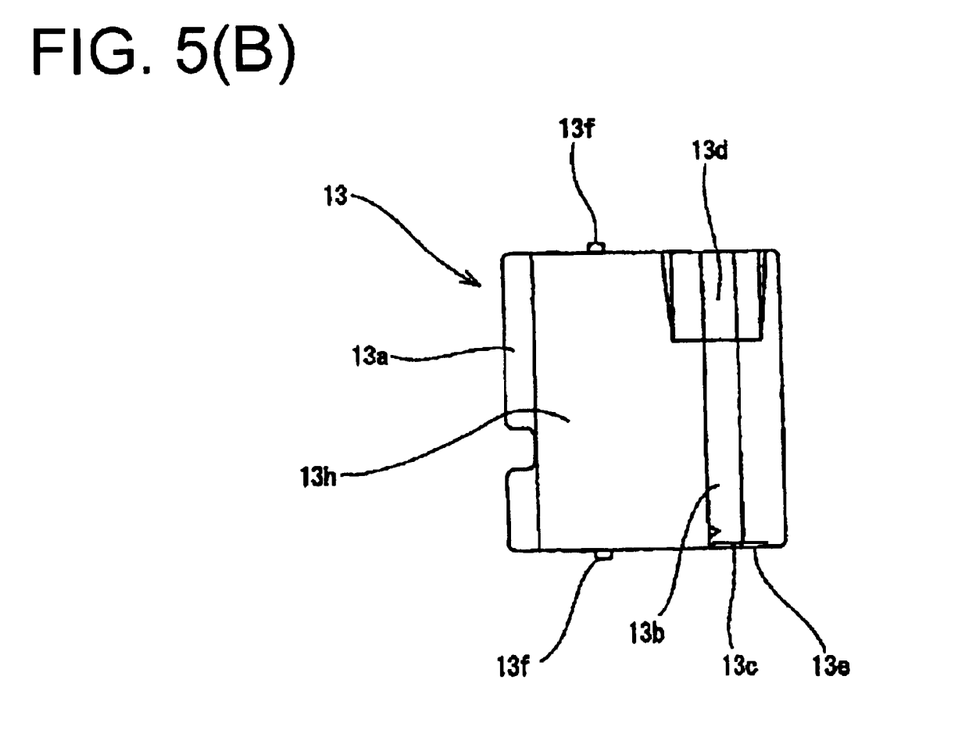
FIG. 5(B) is a top view of the waterproof cover.

A waterproof cover 13 is rotatably mounted on the bracket 12, as shown in FIG. 5. More particularly, the waterproof cover 13 has a substantially plate-shaped main body 13h and walls 13g project down toward the casing 11 from substantially opposite sides of the main body 13h. Shafts 13f project at the bottom ends of the walls 13g and support the cover 13 rotatably on the bracket 12.

The main body 13h of the waterproof cover 13 has a recess 13b for collecting water. A first end of the recess 13b with respect to the longitudinal direction is raised to form a water-diverting portion 13d. A rib 13c projects up at the second end of the recess 13b and has a shorter height than the water-diverting portion 13d. A dropping portion 13e is formed substantially continuously with the one wall 13g and projects downward below the rib 13c.

A closing portion 13a is provided at one side of the main body 13h for substantially covering a part of the connector accommodating portion 11a-1 in the side surface 11a of the casing 11. A groove 13e-1 is formed vertically in substantially the middle of the dropping portion 13e.

The waterproof cover 13 is inclined toward the side surface 11a of the casing 11 at an initial stage, as shown in FIGS. 1 to 4, and a first connector (unillustrated) is fit into the connector accommodating portion 11b-1 in the upper surface 11b of the casing 11 in this state.

The uppermost connector accommodating portion 11a-1 in the side surface 11a of the casing 11 is covered partly by the closing portion 13a of the waterproof cover 13, and hence the connector cannot be fit into the connector accommodating portion 11a-1. The waterproof cover 13 then is rotated into a position to cover the upper surface 11b of the casing 11 shown by phantom in FIGS. 2 and 3 and a second connector (unillustrated) is fit into the connector accommodating portion 11a-1 in the side surface 11a of the casing 11. Thus, an operator cannot forget to return the waterproof cover 13 to a proper position (shown by phantom in FIGS. 2 and 3) because the connector fitting operation is impossible unless the waterproof cover 13 is rotated into the proper position to substantially cover the upper surface 11b.

Figure 7:
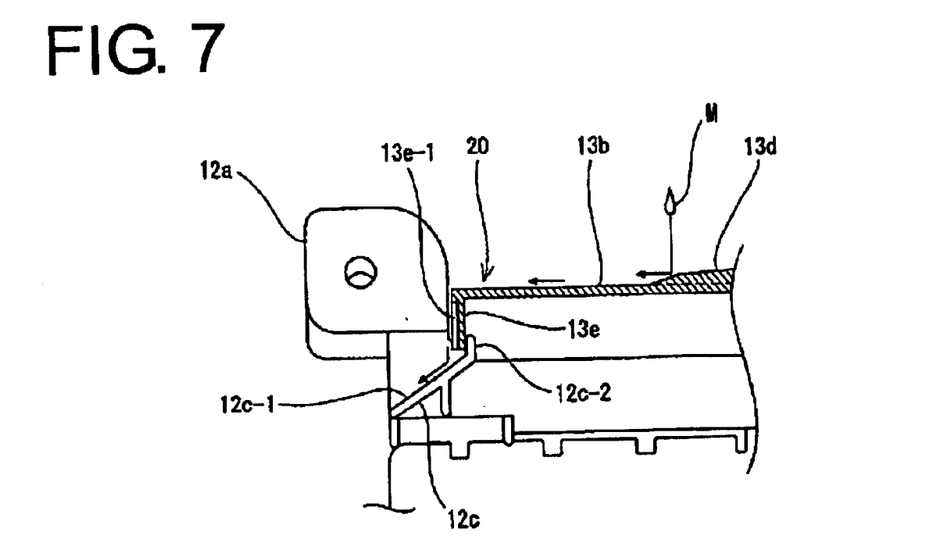
FIG. 7 is a section of an essential portion.
Figure 8:
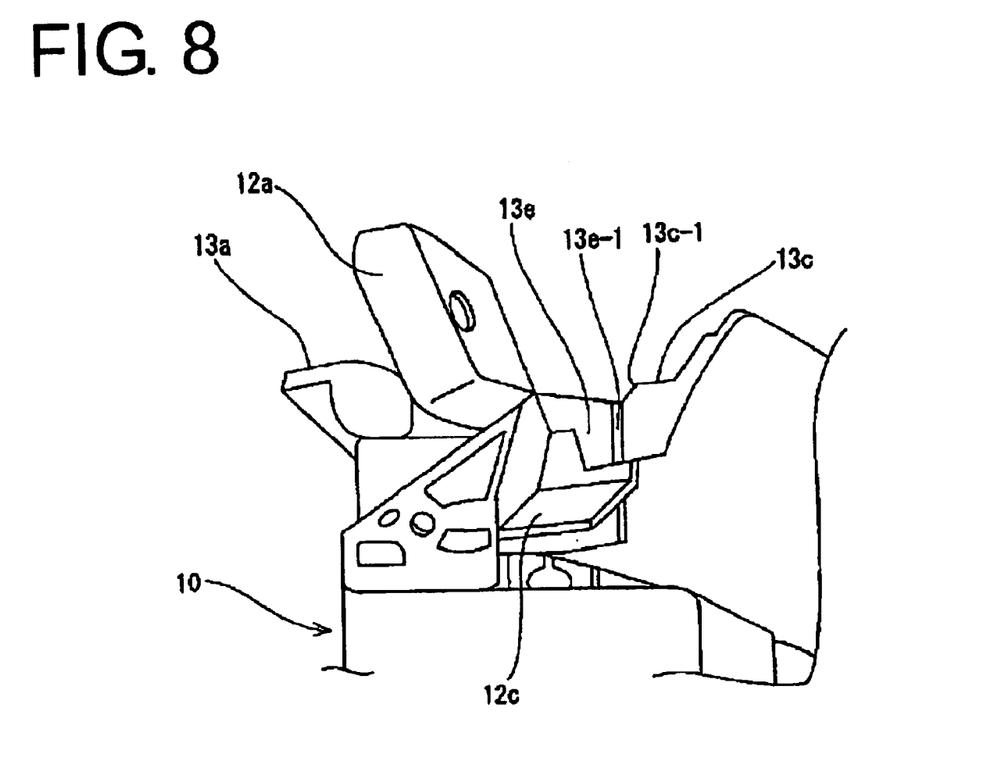
FIG. 8 is a perspective view of the essential portion.

The waterproof cover 13 is at the proper position shown in FIGS. 7 and 8 to cover the upper surface 11b of the casing 11. In this position, the dropping portion 13e of the cover 13 overlaps the outer surface of the vertical portion 12c-2 of the slanted guide portion 12c provided in a standby state at the bracket 12.

Waterdrops M that fall down on the outer surface of the waterproof cover 13 are collected in the recess 13b. The water-diverting portion 13d is raised at the one side of the recess 13b and causes the waterdrops M to run toward the rib 13c at the other side of the recess 13b or down sloped towards the groove 12e-1.

The waterdrops M collected in the recess 13b are caused to stay in the recess 13b and vaporize until reaching such a water level exceeding the rib 13c.

If the waterdrops M staying in the recess 13b reach the water level exceeding the rib 13c before vaporizing, the water M runs down through a cut 13c-1 of the rib 13c along the dropping portion 13e toward the slanted guide 12c.

The groove 13e-1 is formed in the dropping portion 13e. Thus, the water M is guided by the groove 13e-1 and runs reliably down onto the slanted guide 12c.

Water M that falls on the slanted guide 12c is drained out of the junction box 10 along the slanted portion 12c-1.

The recess 13b is slanted so that the waterdrops M run toward the side where the dropping portion 13e is provided.

A drainage path for the waterdrops M that fall down on the outer surface of the waterproof cover 13 is intentionally set. Thus, the waterdrops M dropping down from the waterproof cover 13 are prevented from entering the water-free areas (for example, connector accommodating portion) of the junction box 10.

The waterproof cover 13 is rotatable in a space between the mount portions 12a, 12b of the bracket 12. Thus, it is impossible to integrally or unitarily provide the waterproof cover 13 with a slanted guide projecting more outward than the dropping portion 13e of the waterproof cover 13 since such a slanted guide interferes with the mount portion 12a during rotation of the waterproof cover 13.

Therefore, the slanted guide 12c is provided on the bracket 12 to receive the water dropping down from the dropping portion 13e of the waterproof cover 13, thereby enabling the water to be drained more outward than the water-free areas (for example, connector accommodating portion 13b-1) of the junction box 10.

The slanted guide 12c can be substantially continuous with the dropping portion 13e of the waterproof cover 13 without any inconvenience in design, and may be formed integrally or unitarily at the waterproof cover 13.

The invention has been described with respect to one recess 13b having one water-diverting portion 13d, one rib 13c and one dropping portion 13e. However, the invention also is applicable to covers having two or more such elements appropriately arranged on its upper surface.

Furthermore, the rib 13c can be replaced by a raised portion raised with respect to the bottom of the recess 13b and forming another preferred water collection causing portion to allow at least temporarily collection of the water in the recess 13b until the height of the water exceeds the projecting height of the raised portion.

As is clear from the above description, the drainage path for the waterdrops that fall on the surface of the waterproof cover is set intentionally. Therefore, the waterdrops are prevented from dropping down from the waterproof cover onto the water-free areas of the electrical connection box.

The groove for guiding the water toward the dropping portion of the waterproof cover is vertical. Thus, the waterdrops can securely drop down to an intended place along the groove.

The waterproof cover is rotatably or pivotably mounted and the connector cannot be fit into the connector accommodating portion in the side surface of the casing with the waterproof cover rotated toward the side surface of the casing. Thus, the waterproof cover has to be rotated toward the upper surface of the casing to fit the second connector, thereby preventing the rotatable waterproof cover from being left unreturned.

The dropping portion of the waterproof cover might not be able to be at a position more outward than the water-free areas of the electrical connection box for a certain reason in designing, such as space efficiency. Thus, the water dropping down from the dropping portion of the waterproof cover can be drained outside the water-free areas of the electrical connection box by the slanted guide by providing the slanted guide at the bracket below the dropping portion.

What is claimed is:

1. A drainage construction of a waterproof cover of an electrical connection box, comprising a waterproof cover to be provided on an upper surface of a casing of an electrical connection box,
    wherein the waterproof cover comprises at least one recess for at least temporarily collecting water fallen down on the outer surface of the waterproof cover
    at least one water-diverting portion formed by raising one end portion of the recess, and
    a dropping portion at an end of the recess opposite the water-diverting portion and at least one rib projecting at a portion of the recess opposite the water-diverting portion, whereby waterdrops that fall down on the outer surface of the waterproof cover stay at least temporarily in the recess and subsequently drain along the dropping portion.

2. The drainage construction 1, wherein the dropping portion is below the rib.

3. The drainage construction of claim 2, wherein waterdrops that fall on the outer surface of the waterproof cover stay at least temporarily in the recess and drain along the dropping portion when a level of water exceeds the rib.

4. The drainage construction of claim 1, wherein a groove for guiding the water is formed in the dropping portion of the waterproof cover.

5. A drainage construction of a waterproof cover of an electrical connection box, comprising a waterproof cover to be provided on an upper surface of a casing of an electrical connection box,
    wherein the waterproof cover comprises at least one recess for at least temporarily collecting water fallen down on the outer surface of the waterproof cover, the waterproof cover being rotatably mountable on a bracket for fixing the electrical connection box to a vehicle body to cover the upper surface of the casing;
    at least one water-diverting portion formed by raising one end portion of the recess, and
    a dropping portion at an end of the recess opposite the water-diverting portion, whereby waterdrops that fall down on the outer surface of the waterproof cover stay at least temporarily in the recess and subsequently drain along the dropping portion.

6. The drainage construction of claim 5, wherein at least one rib projects at portion of the recess opposite the water-diverting portion.

7. The drainage construction of claim 5, wherein a first connector is fittable into a connector accommodating portion in the upper surface of the casing with the waterproof cover rotated to a standby position toward a side surface of the casing to block the entrance of a second connector into a connector accommodating portion in the side surface of the casing and the second connector is fittable into the connector accommodating portion in the side surface of the casing with the waterproof cover rotated to a proper position toward the upper surface of the casing.

8. The drainage construction of claim 5, wherein a slanted guide portion projects from the bracket substantially below the dropping portion, and a bottom end of the slanted guide portion is located more outward than water-free areas of the electrical connection box.

9. The electrical connection box of claim 5, wherein a slanted guide portion projects from the bracket at a position below the dropping portion, the slanted guide portion having a bottom end located more outward than water-free areas of the electrical connection box.

10. A waterproof cover for an electrical connection box, the waterproof cover comprising a main body with opposite first and second ends, at least one recess for at least temporarily collecting water fallen down on the outer surface of the waterproof cover, a water-diverting portion at the first end of the main body and projecting up from the recess, a rib at the second end of the main body and projecting up from the recess by a height less than the water-diverting portion and a dropping portion at the second end of the main body and extending down below the recess, whereby waterdrops that fall down on the outer surface of the waterproof cover stay at least temporarily in the recess and subsequently drain along the dropping portion.

* * * * *